(12) United States Patent
Christian

(10) Patent No.: US 12,137,346 B2
(45) Date of Patent: Nov. 5, 2024

(54) CLASSIFIER-BASED MESSAGE ROUTING IN A TELECOMMUNICATIONS NETWORK

(71) Applicant: BRITISH TELECOMMUNICATIONS PUBLIC LIMITED COMPANY, London (GB)

(72) Inventor: Philip Christian, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 17/633,015

(22) PCT Filed: Aug. 1, 2020

(86) PCT No.: PCT/EP2020/071743
§ 371 (c)(1),
(2) Date: Feb. 4, 2022

(87) PCT Pub. No.: WO2021/023678
PCT Pub. Date: Feb. 11, 2021

(65) Prior Publication Data
US 2022/0272538 A1    Aug. 25, 2022

(30) Foreign Application Priority Data

Aug. 5, 2019   (GB) ..................... 1911181

(51) Int. Cl.
*H04W 12/088*   (2021.01)
*H04W 12/106*   (2021.01)
(Continued)

(52) U.S. Cl.
CPC ....... *H04W 12/088* (2021.01); *H04W 12/106* (2021.01); *H04W 12/128* (2021.01); *H04W 40/14* (2013.01); *H04W 4/14* (2013.01)

(58) Field of Classification Search
CPC ............. H04W 12/088; H04W 12/106; H04W 12/128; H04W 4/14; H04W 40/14; H04W 12/08; H04W 12/12
See application file for complete search history.

(56) References Cited

U.S. PATENT DOCUMENTS 6,690,798 B1   2/2004   Dent
9,838,878 B2   12/2017  Sauder et al.
(Continued)

FOREIGN PATENT DOCUMENTS

AU   2016204016 A1   1/2017
AU   2016204016 B2   11/2020
(Continued)

OTHER PUBLICATIONS

Combined Search and Examination Report under Sections 17 and 18(3) for Great Britain Application No. 1911181.4 dated Apr. 14, 2020, 14 pages.
(Continued)

*Primary Examiner* — Liton Miah
(74) *Attorney, Agent, or Firm* — PRANGER LAW PC

(57) ABSTRACT

A computer implemented method of selective transmission of a communications message from a home telecommunications network to a visited telecommunications network for delivery to a subscriber device roaming via the visited network includes receiving the message at the home network; identifying a communications component of the visited network to which the messages is to be routed; defining an input vector for a classifier, the input vector encoding parameters of the communications component; executing the classifier to classify the communications component to determine a reliability state of the communications component; and forwarding the message to the communications component of the visited network for delivery to the sub-
(Continued)

scriber device in dependence on the classified reliability state.

13 Claims, 4 Drawing Sheets

(51) Int. Cl.
*H04W 12/128* (2021.01)
*H04W 40/14* (2009.01)
*H04W 4/14* (2009.01)

(56) References Cited

U.S. PATENT DOCUMENTS

| | | | |
|---|---|---|---|
| 10,306,459 | B1 | 5/2019 | Patil et al. |
| 10,931,668 | B2 | 2/2021 | Mehta |
| 11,265,719 | B2 * | 3/2022 | McDaid .............. H04L 63/1466 |
| 2007/0173224 | A1 | 7/2007 | Buckley et al. |
| 2008/0161012 | A1 | 7/2008 | Haran et al. |
| 2009/0061854 | A1 | 3/2009 | Gillot et al. |
| 2011/0014939 | A1 | 1/2011 | Ravishankar et al. |
| 2011/0105117 | A1 | 5/2011 | Chin et al. |
| 2011/0225632 | A1 | 9/2011 | Ropolyi et al. |
| 2011/0281582 | A1 | 11/2011 | Jiang |
| 2012/0021727 | A1 | 1/2012 | Kelly |
| 2012/0100832 | A1 | 4/2012 | Mao et al. |
| 2012/0184262 | A1 | 7/2012 | Olsson et al. |
| 2013/0217361 | A1 | 8/2013 | Mohammed et al. |
| 2014/0018067 | A1 | 1/2014 | Rajagopalan et al. |
| 2014/0050198 | A1 | 2/2014 | Sugimoto et al. |
| 2014/0157395 | A1 | 6/2014 | Li et al. |
| 2014/0245403 | A1 | 8/2014 | Li et al. |
| 2014/0348065 | A1 | 11/2014 | Lu et al. |
| 2015/0005019 | A1 | 1/2015 | Liu et al. |
| 2015/0172909 | A1 | 6/2015 | Chandramouli et al. |
| 2016/0006753 | A1 | 1/2016 | McDaid et al. |
| 2016/0105802 | A1 * | 4/2016 | Sauder ................. H04Q 3/0025 455/410 |
| 2016/0127908 | A1 * | 5/2016 | Sporton .............. H04W 12/122 455/410 |
| 2017/0041778 | A1 | 2/2017 | Dowlatkhah et al. |
| 2018/0167906 | A1 * | 6/2018 | Chellamani ............. H04W 4/90 |
| 2018/0176854 | A1 | 6/2018 | Lau et al. |
| 2019/0199745 | A1 | 6/2019 | Jakobsson et al. |
| 2020/0007538 | A1 | 1/2020 | Mehta |
| 2020/0053556 | A1 | 2/2020 | Mukherjee et al. |

FOREIGN PATENT DOCUMENTS

| | | |
|---|---|---|
| CN | 106470408 B | 7/2019 |
| EP | 3010265 A1 | 4/2016 |
| WO | WO-2016050990 A1 | 4/2016 |

OTHER PUBLICATIONS

Combined Search and Examination Report under Sections 17 and 18(3) for Great Britain Application No. 1911185.5 dated Apr. 24, 2020, 14 pages.

Engel T., "SS7: Locate. Track. Manipulate. You Have a Remote-Controlled Tracking Device in your Pocket," Dec. 2014, 55 pages.

Extended European Search Report for Application No. 19190071.1 dated Jan. 23, 2020, 11 pages.

Extended European Search Report for Application No. 19190075.2 dated Jan. 23, 2020, 11 pages.

Grassi P.A., et al., "DRAFT NIST Special Publication 800-63B, Authentication and Lifecycle Management," May 18, 2016, Retrieved from Internet URL: https://pages.nist.gov/800-63-3/sp800-63b.html, 39 pages.

Grassi P.A., et al., "NIST Special Publication 800-63B, Digital Identity Guidelines, Authentication and Lifecycle Management," National Institute of Standards and Technology, Jun. 2017, 81 pages.

International Search Report and Written Opinion for Application No. PCT/EP2020/071743 dated Sep. 29, 2020, 15 pages.

International Search Report and Written Opinion for Application No. PCT/EP2020/071744 dated Sep. 29, 2020, 15 pages.

Jensen K., et al., "Better Protection of SS7 Networks with Machine Learning," Sep. 26, 2016, 6th International Conference on IT Covergence and Security (ICITCS), IEEE, Retrieved from Internet URL: https://ieeexplore.ieee.org/document/7740315, Retrieved on Nov. 9, 2016, XP032999146, DOI: 10.1109/ICITCS.2016.7740315, 7 pages.

Raumen H., et al., "Schwachstelle im Mobilfunknetz: KriminelleHacker Räumen Konten Leer," May 3, 2017, 4 pages.

WeDoTechnologies., "Fraud Alert: Exploring SS7 Signaling | WeDo Blog," Retrieved from Internet URL: https://blog.wedotechnologies.com/fraud-alert-exploring-ss7-signaling-to-commit-fraud, May 9, 2019, 5 pages.

"International Preliminary Report on Patentability received for PCT Patent Application No. PCT/EP2020/071743, dated Feb. 17, 2022".

"International Preliminary Report on Patentability received for PCT Patent Application No. PCT/EP2020/071744, dated Feb. 17, 2022".

\* cited by examiner

CLASSIFIER-BASED MESSAGE ROUTING IN A TELECOMMUNICATIONS NETWORK

PRIORITY CLAIM

The present application is a National Phase entry of PCT Application No. PCT/EP2020/071743, filed Aug. 1, 2020, which claims priority from GB Patent Application No. 1911181.4, filed Aug. 5, 2019, each of which is hereby fully incorporated herein by reference.

TECHNICAL FIELD

The present disclosure relates to message routing in a telecommunications network. In particular, it relates to conditional message routing based on a classifier.

BACKGROUND

The short message service (SMS) is a feature of telecommunications networks by which messages can be communicated to and from subscriber devices such as user equipment (UE) or mobile stations (MS). Such messages can be used to provide a second factor of authentication when accessing restricted resources. For example, banking institutions can use SMS messages as a second authentication factor for the authentication of a banking customer for access to, or transacting via, a mobile banking service. It is therefore desirable that such telecommunications messaging services provide secure message delivery that is protected from interception, spoofing and malicious intents.

SUMMARY

According to a first aspect of the present disclosure, there is a provided a computer implemented method of selective transmission of a communications message from a home telecommunications network to a visited telecommunications network for delivery to a subscriber device roaming via the visited network, the method comprising: receiving the message at the home network; identifying a communications component of the visited network to which the messages is to be routed; defining an input vector for a classifier, the input vector encoding parameters of the communications component; executing the classifier to classify the communications component to determine a reliability state of the communications component; and forwarding the message to the communications component of the visited network for delivery to the subscriber device in dependence on the classified reliability state.

In some embodiments, the classifier is trained based on previous communications with the communications component as a training data set.

In some embodiments, responsive to the message being forwarded to the communications component and an assessment of a reliability of the communications component based on a result of forwarding the message, adding the input vector and assessed reliability as a new training example in the training data set and triggering a retraining of the classifier.

In some embodiments, the communications message is a short message service (SMS) message, and the method is a method of a short message service center (SMSC) of the home telecommunications network.

In some embodiments, the communications component of the visited network is one of: a mobile switching center with visitor location register (MSC/VLR); and a mobile management entity (MME).

In some embodiments, the classified reliability state is one of an enumeration of a plurality of states of reliability.

In some embodiments, forwarding the message to the communications component in dependence on the classified reliability state includes: receiving one or more reliability criteria from an originator of the message; and forwarding the message to the communications component based on the reliability criteria evaluated using the classified reliability state.

In some embodiments, the communications component has associated an address and one or more of the parameters is defined in terms of address.

In some embodiments, parameters of the communication component include one or more of: an indication of an association of the communications component with a telecommunications network; an indication of a volume of messages successfully communicated via the communications component; an indication of whether the subscriber device was steered to the communications component by a network roaming steering system of the home network; an indication of whether a correctly encrypted response is received to an over-the-air (OTA) message dispatched to the subscriber device connected via the visited network; an indication of whether a correctly encrypted response is received to an OTA message dispatched to a device of a second subscriber device connected via the visited network, the second subscriber device being a subscriber of the home network; an indication of whether one or more previous messages have been successfully communicated to one or more devices communicating via the visited network, the devices being subscribers of the home network; an indication of a change to a unique identifier of the subscriber device; an indication of a change to a Subscriber Identity Module (SIM) of the subscriber device); an indication of communications occurring with the communications component that are inconsistent with the nature of the communications component; an indication of an identification of anomalous signaling traffic communicated via the communications component; an indication of an output of a velocity check for the subscriber device; an indication of a failure of the subscriber device to transition to a different telecommunications network when steered by a network roaming steering system of the home network; an indication of a difference between a telecommunications network to which the communications component is associated, and a telecommunications network to which data traffic is sent or from which data traffic is received by the home network; an indication of a proportion of a number requests for routing information for messages received at the home network to a number of occasions messages are forwarded to the visited network; and an indication of asymmetric traffic flows to and from the communications component.

In some embodiments, messages which are not forwarded are retained for a re-evaluation of the reliability metric at a subsequent time.

In some embodiments, the home network is configured to use SMS Home Routing.

According to a second aspect of the present disclosure, there is a provided a computer system including a processor and memory storing computer program code for performing the method set out above.

According to a third aspect of the present disclosure, there is a provided a computer system including a processor and memory storing computer program code for performing the method set out above.

BRIEF DESCRIPTION OF THE FIGURES

Embodiments of the present disclosure will now be described, by way of example only, with reference to the accompanying drawings, in which.

DETAILED DESCRIPTION

Figure 1:
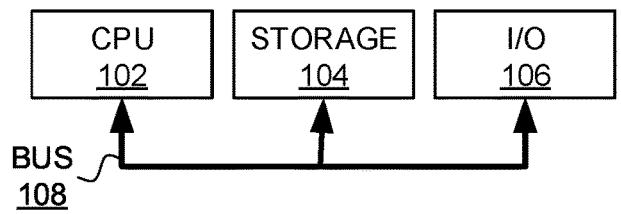
FIG. 1 is a block diagram a computer system suitable for the operation of embodiments of the present disclosure.

During the December 2014 "Chaos Communication Congress" event hosted by the Chaos Computer Club in Hamburg, Germany, Tobias Engel delivered a presentation entitled "SS7: Locate. Track. Manipulate" in which certain security weaknesses of the Mobile Application Part (MAP) variant of Signaling System 7 (SS7) were described. Subsequently, in May 2016, the U.S. Department of Commerce National Institute of Standards and Technology (NIST) published "Draft Special Publication 800-63B—Digital Authentication Guideline". The use of SMS for out-of-band authentication (such as part of multi-factor authentication schemes) was proposed for deprecation in that draft publication. Additionally, there have been reports of SMS message interceptions including by banking institutions.

While alternative multi-factor authentication mechanisms are available, including the use of dedicated smartphone apps or authenticator apps such as Google Authenticator, SMS provides a largely ubiquitous communications channel for authentication. Furthermore, a considerable number of subscribers continue to use devices that may not support such apps. Additionally, notwithstanding the availability of alternative multi-factor authentication mechanisms such as apps, some organizations nonetheless employ SMS communications as part of an initial installation, configuration or setup of an authentication app, subjecting such processes to the vulnerabilities of SMS.

A particular security weakness in SMS message communication arises when a subscriber is roaming. Roaming refers to the ability for a mobile subscriber to automatically make and receive voice calls, messages, send and receive data, or access other services, including home data services, when travelling outside a geographical coverage area of the subscriber's home network. This is achieved by means of a visited network at the location of the roaming subscriber. For example, GSM (Global System for Mobile communications) subscriber devices roaming via a visited network trigger the generation of a random code number (RAND) by the home network for communication to a network authentical center (AuC) of the home network and the subscriber device. Each of the AuC and a Subscriber Identity Module (SIM) of the subscriber device share common cryptographic information (such as a key $k_i$) by which, using a cryptography algorithm, each can generate a response value based on the RAND. Thus, a response value is generated by the home AuC (in the 2G and 3G communications standards, the AuC response value is known as SRES—signed response; in the 4G communications standard, the AuC response value is known as XRES—eXpected response). Additionally, a response value is generated by the SIM of the subscriber device. The response values are then compared at a component of the visited network to verify that the subscriber device is in possession of the subscriber's SIM.

The component of the visited network can include a Mobile Switching Center with Visitor Location Register (MSC/VLR) (as is known in 2G and 3G networks) or a Mobile Management Entity (MME) (as is known in 4G networks). Roaming by a subscriber device is achieved partly by a location update process in which a visited MSC/VLR (or, in a 4G network, MME) communicates a location update message to a Home Location Register (HLR) (or, in a 4G network, a Home Subscriber Server (HSS)). In this way, calls and messages communicated to a roaming subscriber device are routed to the MSC/VLR associated with the location update message.

In general, a MSC/VLR component will be referenced herein, though it will be appreciated by those skilled in the art that network components attributed to 4G networks such as MME will have suitability for use in the context described. Similarly, a HLR component will be referenced herein though it will be appreciated by those skilled in the art that network components attributed to 4G networks such as HSS will have suitability for use in the context described. Thus, while reference and description may be provided for 2G and 3G network components in the remainder of this specification and the drawings, it will be appreciated by those skilled in the art that suitable alternative 4G components will be apparent to those skilled in the art and that the disclosure of embodiments of the present invention applies equally to such 4G components.

Thus, a comparison of the responses generated by the AuC and the subscriber device SIM is used to determine whether the subscriber device location should be updated in the HLR and whether communications (e.g. calls and messages) should be routed to the subscriber device via the MSC/VLR of the visited network. Accordingly, the process depends on the reliability of the MSC/VLR of the visited network to make an appropriate determination based on the comparison of responses.

A challenge arises in that the MSC/VLR undertaking the comparison of responses is that of the visited network, and the reliability of the MSC/VLR may be questionable. The home network relies on the MSC/VLR of the visited network to compare the responses correctly and permit or preclude a location update faithfully. In particular, the home network does not have visibility of the response from the subscriber device and cannot make its own determination.

Parties with malicious intent can therefore take advantage of this arrangement. For example, a new telecommunications network can be instantiated purporting to have the subscriber device local to it and to feign a comparison of responses. Such networks, as malicious networks, can issue a location update request to a subscriber's home network—purporting that the subscriber device is connected to the malicious network when it is not. In particular, it is not necessary for the malicious network to actually have a response from the subscriber device in order to claim that responses match. A home network accepting such a location update request will send subsequent SMS messages to the malicious network even though the subscriber device is not connected via the malicious network. In such a context, a Short Message Service Centre (SMSC) of the home network is not normally involved in the communication of SMS messages to the subscriber device. In this way, a malicious party can receive SMS messages not intended for it by way of interception.

This problem is mitigated in 5G telecommunications networks because both a home network and visited network participate in responses and derivations of responses from both a SIM and the home network AuC. With 5G, responses from the SIM are communicated to the home network and cannot be spoofed. However, in order to allow a 5G subscriber to roam in a region where 5G is not available, 5G networks may in some scenarios remain vulnerable to 3G and 4G vulnerabilities.

SMS Home Routing is a technique that provides for SMS messages to be routed by an SMSC of a home network even when a subscriber device is roaming via a visited network. With Home Routine, SMS routing decisions are taken by the SMSC or home network router (HNR) of the home network. These network nodes perform a lookup in the HLR or HSS to ascertain which MSC/VLR the mobile device is connected to, and then forward it there. More specifically they send it to the Global Title (GT) unique address that sent a most recent successful location update.

Embodiments of the present disclosure provide selective transmission of a communications message such as SMS from a home telecommunications network to a visited telecommunications network in which the home network uses home routing. A condition message routing component (CMRC) is provided as part of, or in conjunction with an, SMSC of the home network to determine a reliability of a communications component of the visited network, such as an MSC/VLR or MME of the visited network. Forwarding of the message to the communications component of the visited network is effected in dependence on the determined reliability. In this way, malicious communications components such as a malicious MSC/VLR can be detected through reliability assessment.

FIG. 1 is a block diagram of a computer system suitable for the operation of embodiments of the present disclosure. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
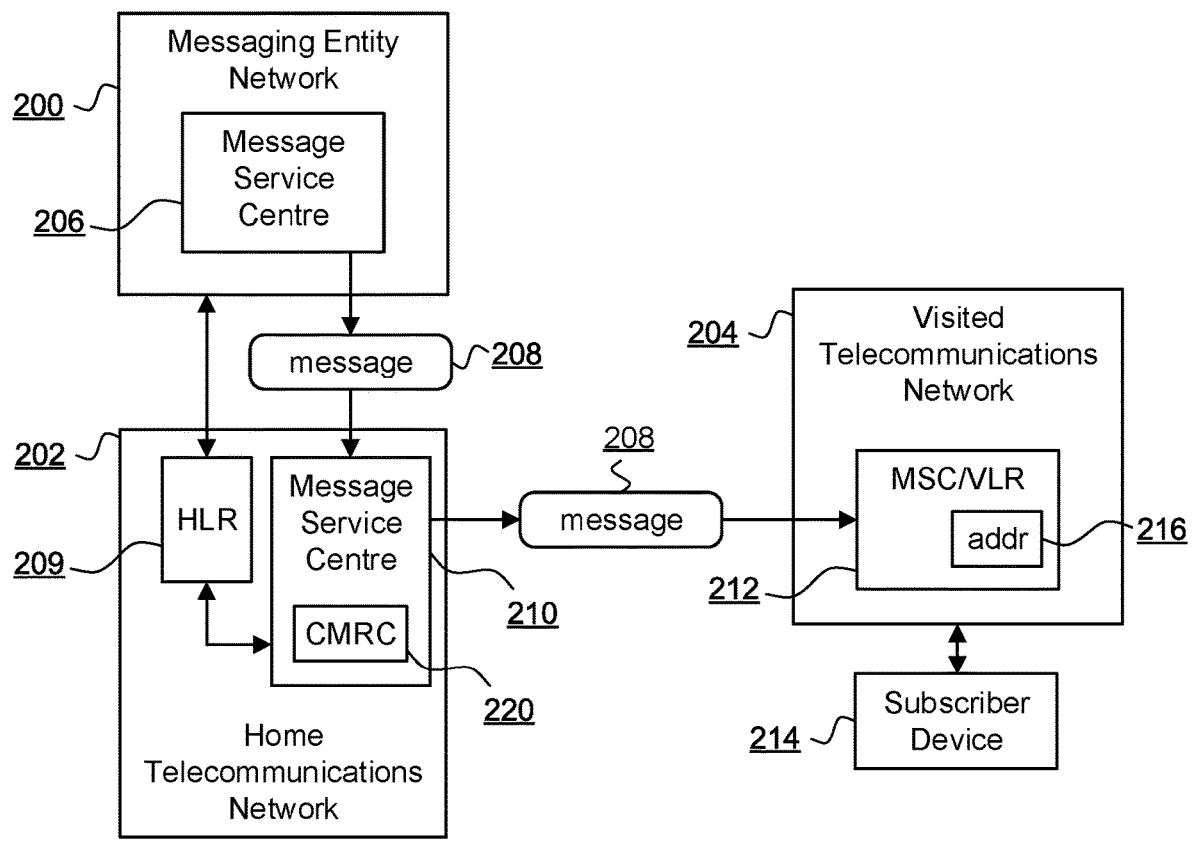
FIG. 2 is a component diagram of an arrangement for the selective transmission of communications messages according to embodiments of the present disclosure.

FIG. 2 is a component diagram of an arrangement for the selective transmission of communications messages according to embodiments of the present disclosure. A subscriber device 214 is a user equipment (UE), mobile station (MS) or other suitable mobile telecommunications device. The subscriber device 214 is roaming via a visited telecommunications network 204. A messaging entity provides services for transmitting a message directed to the subscriber device 214 for a message originator. The message originator can be an organization, agency or other entity requiring messaging services such as a financial services institution, authentication service provider, government agency, access control service provider, security service provider, or any other entity as will be apparent to those skilled in the art. Notably, the message originator and messaging entity can be one and the same.

The messaging entity communicates a message for transmission to the subscriber device 214 via a messaging entity network 200 for which a message service center 206 is provided. The message service center 206 is, for example, an SMSC. The message service center 206 forwards a message 208, such as an SMS message, to the subscriber device 214 via a home telecommunications network 202 for the subscriber device 214. The home network 202 is a network associated with the subscriber device such that the subscriber device is primarily registered with the home network 202. The visitor network 204, on the other hand, is a network outside the bounds of the home network 202, and the subscriber device 214 communicates via the visitor network 204 while roaming.

The message 208 is routed by the home network 202 employing Home Routing as previously described and known to those skilled in the art. In particular, the message 208 is routed by an SMSC 210 of the home network. The SMSC 210 of the home network determines routing information for the subscriber device 214 based on a current location of the subscriber device 214 with reference to, for example, the HLR 209 of the home network 202. The routine information for the subscriber device 214 includes an identification of a communications component 212 of the visited network 204 to which the message 208 is to be forwarded to effect delivery to the subscriber device 214. For example, the communications component 212 is an MSC/VLR of the visited network 204, or an MME of the visited network 204. The communications component 212 is uniquely addressable in the set of telecommunications networks 200, 202, 204 such as by way of a Global Title (GT) address as is known from the Signaling Connection Control Part (SCCP) protocol. Thus, the communications component 212 includes an address 216. The SMSC 210 of the home network is capable of forwarding the message 208 to the identified communications component 212 of the visited network based on its address 216 for onward delivery to the subscriber device 214.

According to embodiments of the present disclosure, the routing of the message 208 by the SMSC 210 of the home network is performed with reference to, using or by a conditional message routing component (CMRC) 220. The CMRC 220 is a hardware, software, firmware or combination component arranged to, at least, determine a reliability of the communications component 212 of the visited network 204 identified as a target for forwarding of the message 208 to the subscriber device 214. Manners in which the reliability can be determined and used are described in detail below. It will be appreciated that the CMRC 220 can be provided as an integral part of the SMSC 210, as a function of the SMSC 210, a function or device of the home network 202 accessible to the SMSC 210 or otherwise as will be apparent to those skilled in the art. In one embodiment, a reliability indicator is a numerical measure of a degree of reliability on a predetermined continuum of measures. Further, in one embodiment, the message originator specifies reliability criteria accessible to, received by or otherwise available to the CMRC 350 on which basis the CMRC 350 determines how to handle the message 208. Handling of the message 208 can include one or more of, inter alia: forwarding the message 208 to the communications component 212 of the visited network; precluding forwarding of the message 208 to the communications component 212 of the visited network; postponing forwarding of the message 208 to the communications component 212 of the visited network; postponing forwarding of the message 208 until the subscriber device 214 transitions to a different communications component 212; and discarding the message 208.

The reliability criteria of the message originator defines actions to be performed, and the conditions for those actions, by the CMRC 350 in routing the message 208. Thus, by enforcement of the reliability criteria, the CMRC 350 provides conditional message routing that is selective by way of the reliability criteria.

Figure 3:
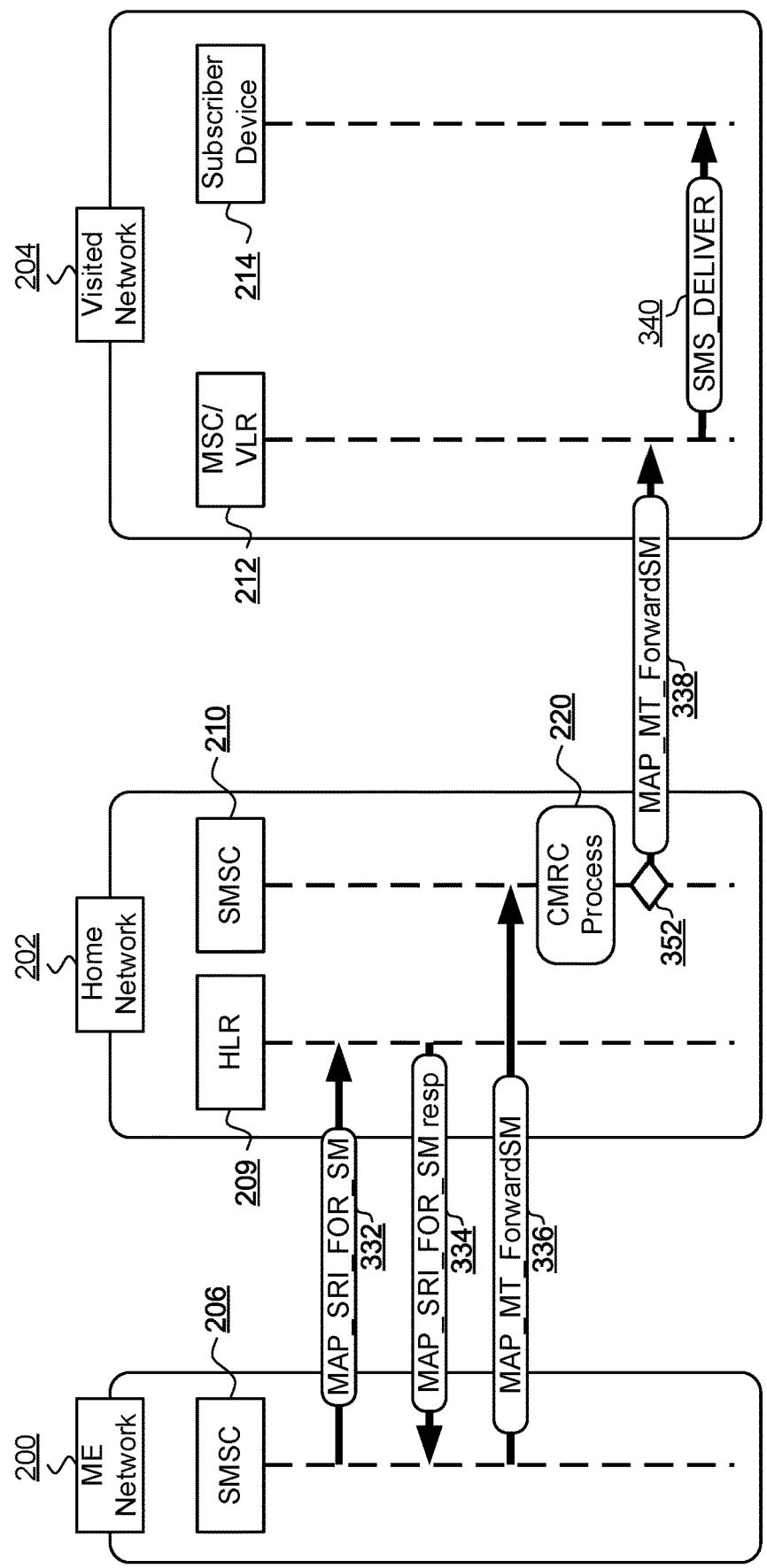
FIG. 3 is a flow diagram of a method for the selective transmission of communications messages according to embodiments of the present disclosure.

FIG. 3 is a flow diagram of a method for the selective transmission of communications messages according to embodiments of the present disclosure. Many of the features of FIG. 3 are identical to those described above with respect to FIG. 2 and these will not be repeated here. The flow diagram of FIG. 3 depicts the high-level operations involved in the communication of a message from a messaging entity to the subscriber device 214 roaming via the visited network 204. Initially, at 332, the SMSC 206 of the message entity network 206 requests, from the HLR 209 of the home network 202, routing information for sending the message 208 to the subscriber device 214 (MAP_SRI_FOR_SM). The HLR 209 sends routing information in response at 334 (MAP_SRI_FOR_SM resp). The home network 202, being configured for Home Routing, identifies the SMSC 210 of the home network 202 for routing of the message 208 to the subscriber device 214. At 336 the SMSC 206 of the messaging entity network 200 forwards the message 208 to the SMSC 210 of the home network 202. The SMSC 210 identifies the communications component 212 of the visited network 204 for the subscriber device 214. The CMRC 220 of the SMSC 210 is operable on the basis of an identifier of the communications component 212 and one or more reliability criteria 446 defined by the message originator to forward the message 208 to the communications component 212 of the visited network 204 in dependence on a determination of reliability of the communications component 212. Thus, the forwarding of the message 208 at 338 (MAP_MP_ForwardSM) is conditional at 352. Subsequently, if received by the communications component 212 of the visited network 204, the message 208 is delivered by the communications component 212 to the subscriber device 214 at 340 (SMS DELIVER).

Exemplary criteria and parameters that can be employed for the determination of reliability of the communications component 212 will now be described with reference to FIGS. 4 to 7.

Figure 4:
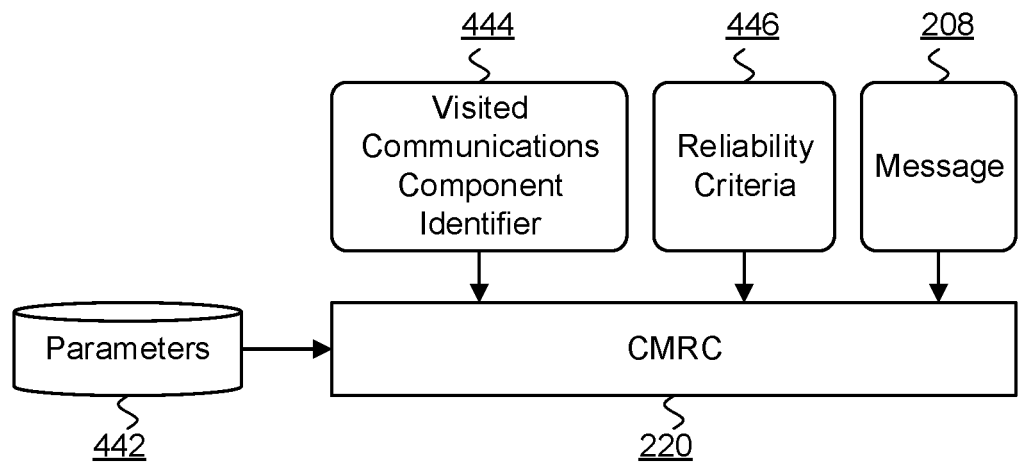
FIG. 4 is a component diagram of an arrangement of a conditional message routing component in accordance with embodiments of the present disclosure.

FIG. 4 is a component diagram of an arrangement of a CMRC 220 in accordance with embodiments of the present disclosure. According to the arrangement of FIG. 4, the CMRC 220 accesses, receives or otherwise has available to it an identifier 444 of the communications component 212 of the visited network 204. For example, the identifier 444 is the unique address of the communications component 212 such as the GT. Further, one or more reliability criteria 446 associated with, defined by or provided by a message originator is available to the CMRC 220. Additionally, the message 208 for routing can be provided to the CMRC 220. In some embodiments the CMRC 220 operates as a function, service or facility of the SMSC 210 of the home network 202 and the message 208 is not, itself, accessed by the CMRC 220, rather the CMRC 220 can inform a routing/forwarding function of the SMSC 210 in respect of the message 208 as will be apparent to those skilled in the art.

The reliability criteria 446 define the conditions under which the message 208 is to be forwarded to the communications component 212 of the visited network 204 or otherwise handled by the SMSC 210 of the home network 202. For example, where reliability is determined according to one of: a numeric scale of reliabilities; an enumerated list of categories of reliability; a set of classes of reliability, or similar, then the reliability criteria 446 can be defined in terms of a point, threshold or limit on such scale, one or more categories in such list or one or more classes in such set. For example, a message originator may require that reliability of the communications component 212 can be absolutely assured such that there is no prospect of interception of the message 208. Alternatively, a message originator may tolerate lesser degrees of assuredness depending on the circumstances, context and nature of the message 208. In one embodiment, the reliability criteria 446 can be defined, communicated to or otherwise made available to the SMSC 210 of the home network 202 by the message originator via, for example, an application programming interface (API).

According to one embodiment of the present disclosure, the CMRC 220 evaluates a reliability metric for the communications component 212 of the visited network by accessing records for the communications component 212 in a data store 442 such that each record includes one or more parameters for the reliability metric evaluation. In some embodiments, the communications component 212 is referenced in such records by the address 216 of the component such as its GT. The parameters for the reliability metric evaluation for a communications component 212 are defined based on one or more of: previous communications between elements or components of the home network 202 and the communications component 212; previous communications with the subscriber device 214 while the subscriber device is roaming via the visited network 204; characteristics of the communications component 212 determined by elements or components of the home network 202; and characteristics of the subscriber device 214 while the subscriber device is roaming via the visited network 204. Each such parameter stored in the data store 442 can have a positive or negative impact on an assessment of reliability for the communications component 212 such as by negatively positively or impacting a metric of reliability.

Parameters and/or the data records including the parameters can be obtained from, via, or provided by elements of components of the home network 202 including, inter alia: other SMSCs of the home network 202 on which basis it is possible to determine if messages and normal communications flow from the common component; Roaming Steering control nodes of the home network 202; an over-the-air (OTA) platform of the home network 202; an SS7 Security Monitoring Systems or SS7 Firewall of, relating to or configured for the home network 202; Diameter or HTTP2 monitoring systems; a "Welcome SMS" messaging system arranged to dispatch a welcome message to roaming subscriber devices; a SIM swap database; an International Mobile Equipment Identity (IMEI) checking systems; a Gateway GPRS Support Node (GGSN) or MME which is handling subscriber's data traffic; a Signal Transfer Point (STP) router detecting asymmetric traffic routes or inbound routes that do not match routing tables; and other entities and components as will be apparent to those skilled in the art. Additionally, it will be appreciated by those skilled in the art that queries and/or requests to any or all of these systems can be proxied and/or cached though an intermediate component or system, or hosted on an existing security platform or signaling monitoring system or firewall.

Exemplary parameters of the communication component 212 suitable for evaluating a reliability metric will now be considered by way of example only. Parameters can include:

Indications of an association of the communications component 212 with a telecommunications network. For example, reliability is more assured if the communications component 212 belongs to, is provided by, is operated by or otherwise related to the operator of the home network 202 or to an operator or network having a trusted relationship with the operator of the home network 202. Further, a communications component 212 or visited network 204 that is not known, has never been used or seen by the home network 202 or devices therein is an indication of lesser reliability.

Indications of a volume of messages successfully communicated via the communications component. For example, reliability is more assured if the communications component 212 is known to be used for a relatively large volume of communications for other subscribers registered with the home network 202 without indications of abnormality. Further, a communications component 212 having never sent an outbound message is a negative indicator of reliability.

Indications of whether the subscriber device 214 was steered to the particular communications component 212 by, for example, a network roaming steering system of the home network 202. Such steering can be a positive indication of reliability. In contrast, indications of a failure of the subscriber device 214 to transition to a different telecommunications network when steered by a network roaming steering system of the home network can be a negative indication of reliability of the communications component 212 with which the subscriber device 214 is now located.

Indications of whether a correctly encrypted response is received to an over-the-air (OTA) message dispatched to the subscriber device 214 connected via the visited network. Such correctly encrypted responses are positive indications of reliability of the communications component 212 whereas incorrect or unexpected responses are not. Similarly, a positive indication of reliability can be determined when correctly encrypted response is received to an OTA message dispatched to a device of a different, e.g. second, subscriber device connected via the visited network 204, the second subscriber device being a subscriber of the home network 202.

Indications of whether one or more previous messages have been successfully communicated to one or more devices communicating via the visited network 204, the devices being subscribers of the home network 202. Such successful communications are positive indications of reliability whereas unsuccessful communications are negative indications.

Indications of a change to a unique identifier such as the IMEI of the subscriber device 214. Such a change constitutes a negative indication of reliability of the communications component 212 whereas the absence of a change of such an identifier is a positive indication of reliability.

Indications of a change to a SIM of the subscriber device 214. Such a change constitutes a negative indication of reliability of the communications component 212 whereas the absence of a change of such an identifier is a positive indication of reliability.

Indications of communications occurring with the communications component 212 that are inconsistent with the nature of the communications component 212. For example, where the communications component 212 has sent other SS7 MAP messages which are not typical of an MSC/VLR. By way of example, a non-local operator's SMSC may send SS7 MAP messages such as "ForwardSM" or "SRI" rather than authentication requests or Location Update which are typical of an MSC/VLR. A node that sends both may be suspicious and indicative of a less reliable communications component 212.

Indications of an identification of anomalous, unusual or unexpected signaling traffic communicated via the communications component 212 such as anomalous SS7 traffic detected by an SS7 Monitoring System. Such an indication is indicative of a less reliable communications component 212.

Indications arising from an output of a velocity check for the subscriber device 214. For example, where the subscriber device 214 is purported to be located with a communications component 212 that it is unlikely to have been possible to travel to since a previous location update in the time available. E.g. if the communications component 212 is located in the USA and requests a location update within only two hours of the subscriber device 214 being located Europe, it is likely that such a location request is anomalous. Such anomalous location requests indicate a less reliable communications component 212.

Indications of a difference between a telecommunications network to which the communications component 212 is associated, and a telecommunications network to which data traffic is sent or from which data traffic is received by the home network 202. For example, the communications device 212 can be determined to belong to a network (or network operator) that differs from a network (or operator) indicated by other protocols such as Diameter (for authentication, authorization, and/or accounting) or HTTP2. Such indications lead to a determination of a lesser degree of reliability of the communications component 212.

Indications of a proportion of a number requests for routing information for messages received at the home network 202 to a number of occasions messages are forwarded to the visited network 204, such a proportion being indicative of anomalous behavior and less reliability in the communications component 212.

Indications of asymmetric traffic flows to and from the communications component 212 tending to indicate less reliability of the communications component 212. For example, where outbound traffic to the communications component 212 goes through an operator's European SS7 interconnects, but inbound traffic is from America or Africa, there may be an indication that the communications component 212 is actually two different nodes on the SS7 network with separate send and receive components hosted by separate providers or aggregators, so indicating a lack of reliability.

Indications of a SIM swap time period that may be used by a message originator in a definition of acceptable reliability criteria.

Figure 5:
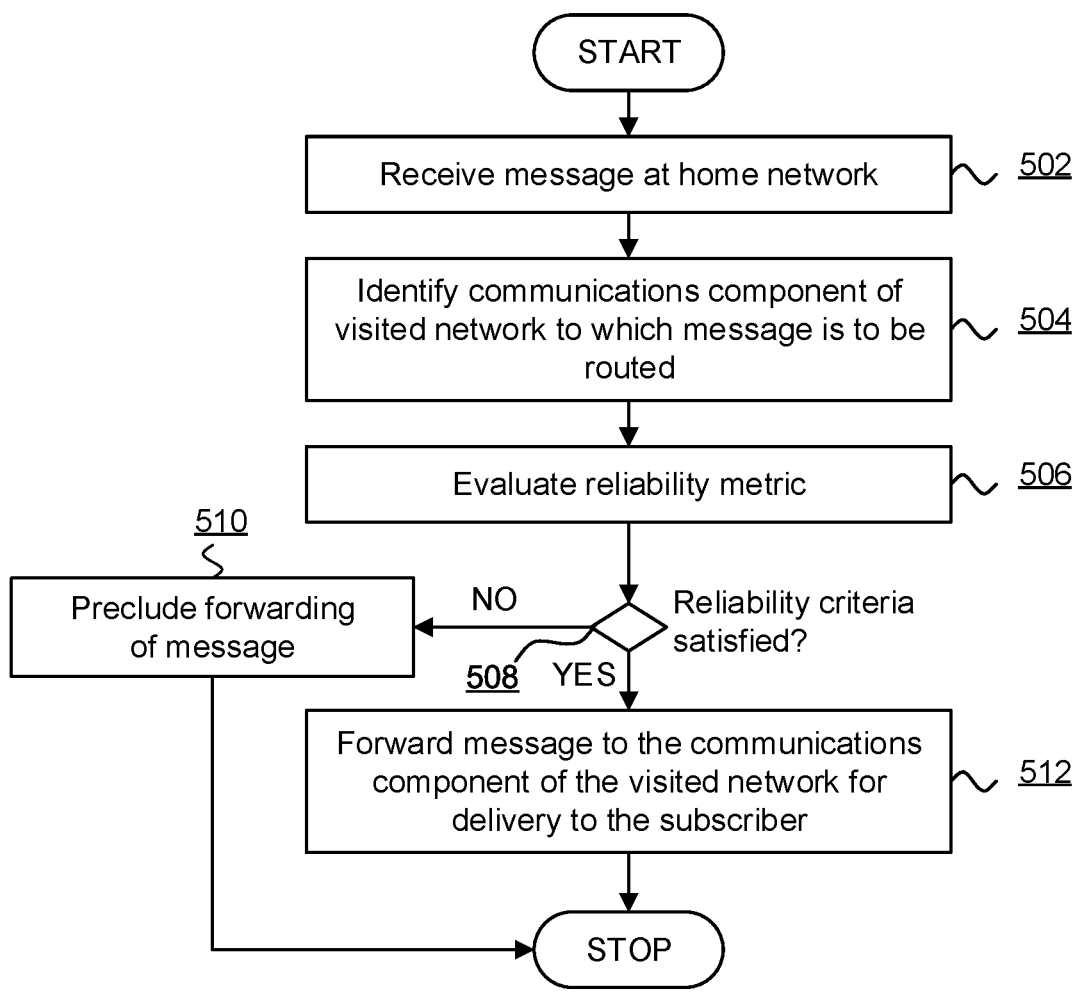
FIG. 5 is a flowchart of a method for the selective transmission of communications messages according to embodiments of the present disclosure.

FIG. 5 is a flowchart of a method for the selective transmission of communications messages according to embodiments of the present disclosure. Initially, at 502, the SMSC 210 receives the message 208 at the home network 202. At 504 the communications component 212 of the visited network 204 via which the subscriber device 214 is roaming is identified. At 506 the reliability metric is evaluated and the reliability criteria 446 for the message originator are assessed at step 508. Where the reliability criteria 446 are not satisfied, forwarding of the message is precluded at 510 pending other options as determined by the message originator (such as postponement, re-evaluation, discarding the message, etc.) Where the reliability criteria 446 are satisfied, the SMSC 210 forwards the message to the communications component 212 at 512 for delivery to the subscriber device 214.

Figure 6:
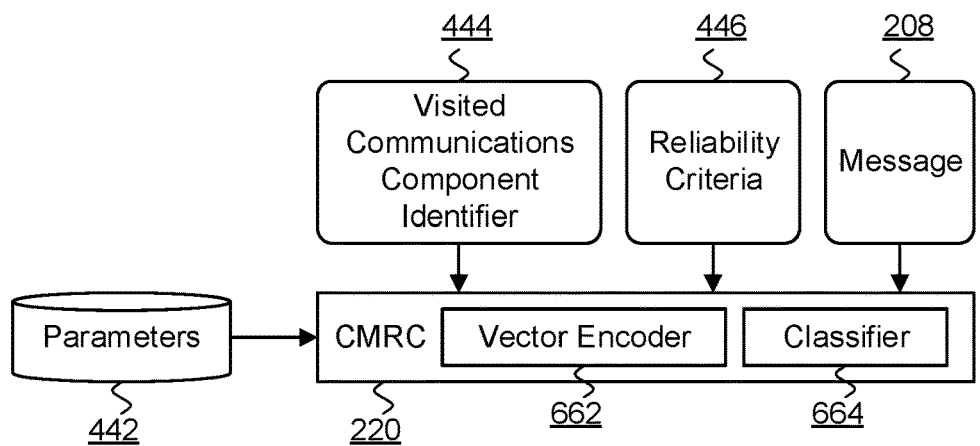
FIG. 6 is a component diagram of an arrangement of a conditional message routing component in accordance with embodiments of the present disclosure.

FIG. 6 is a component diagram of an arrangement of a CMRC 220 in accordance with embodiments of the present invention. Many of the elements of FIG. 6 are identical to those described above with respect to FIG. 4 and these will not be repeated here. CMRC 220 of FIG. 6 differs to that described previously in that the CMRC 220 of FIG. 6 is arranged to determine a reliability state or class of the communications component 212 based on a classifier 664.

The classifier 664 is a computer implemented machine learning algorithm defined to classify input states into one of a series of possible output states. In the context of embodiments of the present disclosure, the classifier 664 is defined to classify a set of parameters influencing a determination of the reliability of the communications component 212 into one of a set of discrete reliability classifications. The reliability classifications are, for example, an enumeration of classes of reliability that may constitute progressively different extents of reliability (such as an enumeration of an otherwise continuous metric of reliability) or distinct reliability classes having discrete definitions by way of the classifier 664.

In one embodiment, the classifier 664 is constituted as a machine learning algorithm such as, by way of example: a perceptron classifier; a naive Bayes classifier; a decision tree classifier; a logistic regression classifier; a k-nearest neighbor classifier; an artificial neural network or deep learning classifier; a support vector machine or other classifier as will be apparent to those skilled in the art. The classifier 664 is trained based on information relating to the communications component 212 such as previous communications therewith and previous determinations in respect thereof. In particular, training data can include information stored as parameters in records of the data store 442 as previously described. In a preferred embodiment, a vector encoder 662 is provided as a hardware, software, firmware or combination component for generating an input vector representation of a set of parameters on which basis the classifier 664 is trained and on which basis the classifier 664 classifies. For example, a vector encoding of parametric indications such as those previously described can be generated by the vector encoding such that, by way of example, each vector dimension corresponds to a particular parametric indication or a measure of a parameter, such that each input unit of the classifier 664 receives a distinct dimension of the vector for classifying the entire vector into one of a set of distinct reliability classes. Thus, a vector representation by be binary to provide an indication or absence of an indication of a particular characteristic for the communications component 212, or a value corresponding to a measure or extent of a particular characteristic for the communications component 212. The parameters so encoded can include those parameters previously described.

In this way the CMRC 220 is operable to encode parameters for the communications component 212 as, for example, a vector representation via the vector encoder 662 in order that the trained classifier 664 can identify a class of reliability for the communications component 212 on which basis routing of the message 208 (or precluding of forwarding of the message 208) can be determined. In a preferred embodiment, the CMRC 220 is supplemented by a training component for training the classifier 664 such that the training component is responsive to indications of reliable or unreliable communications with, via, to or through the communications component 212. Such indications can be used, in combination with a set of parameters relating to such communications, as a new training example for the classifier 664 such as by a backpropagation training mechanism through which the classifier 664 is additionally trained to incorporate the new training example. For example, retraining of the classifier 664 can be triggered with training data including the new training example.

Figure 7:
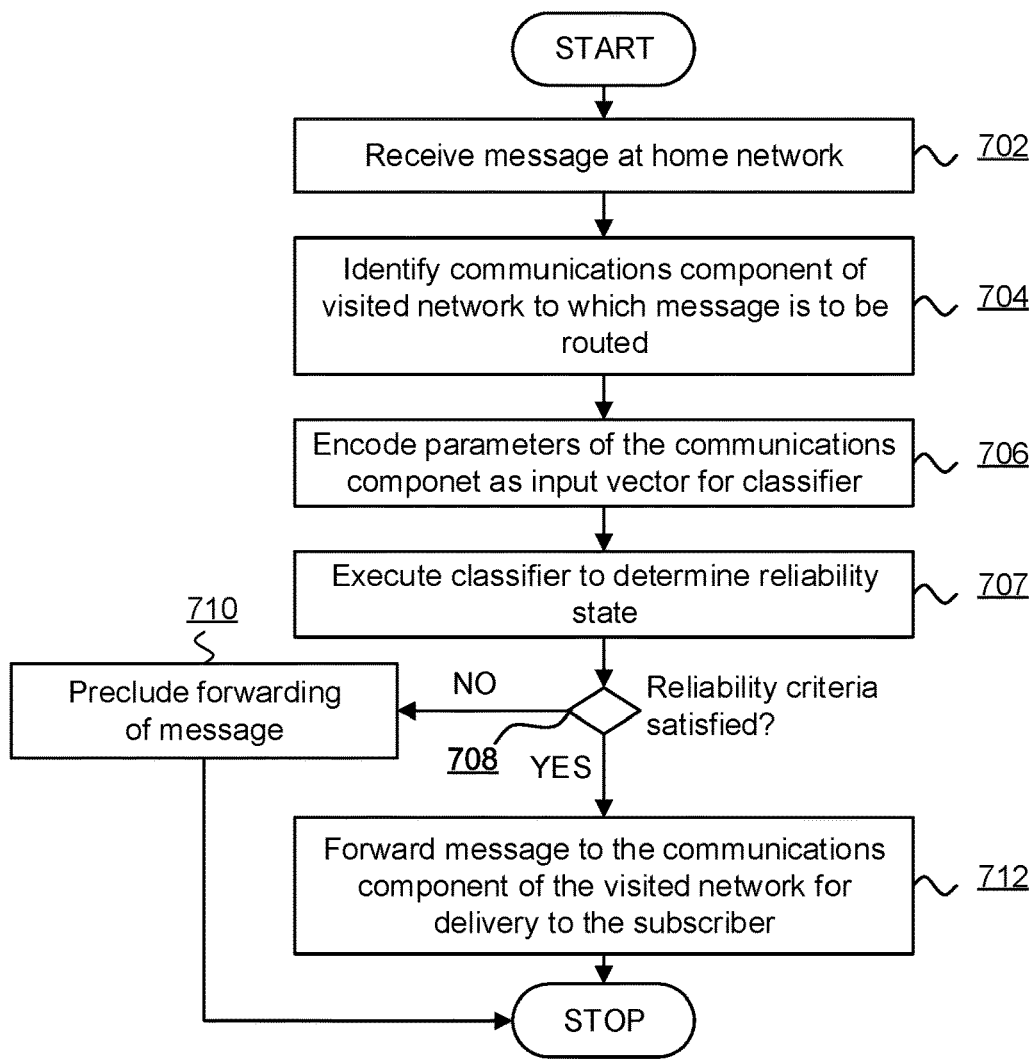
FIG. 7 is a flowchart of a method for the selective transmission of communications messages according to embodiments of the present disclosure.

FIG. 7 is a flowchart of a method for the selective transmission of communications messages according to embodiments of the present disclosure. Initially, at 702, the SMSC 210 receives the message 208 at the home network 202. At 704 the communications component 212 of the visited network 204 via which the subscriber device 214 is roaming is identified. At 706 parameters of the communications component 212 from the data store 442 are encoded as an input vector by the vector encoder 662 for input to the classifier 664. At 707 the classifier is executed with the input vector to determine a state of reliability of the communications component as a class of reliability from the classifier 664. The reliability criteria 446 are assessed at 708 to determine if they are satisfied based on the classification of the communications component 212. Where the reliability criteria 446 are not satisfied, forwarding of the message is precluded at 710 pending other options as determined by the message originator (such as postponement, re-evaluation, discarding the message, etc.) Where the reliability criteria 446 are satisfied, the SMSC 210 forwards the message to the communications component 212 at 712 for delivery to the subscriber device 214.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present disclosure has been described in relation to the above described example embodiments, the invention is not limited thereto and that there are many possible variations and modifications which fall within the scope of the claims.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method of selective transmission of a communications message from a home telecommunications network to a visited telecommunications network for delivery to a subscriber device roaming via the visited network, the method comprising:
   receiving the communications message at the home network;
   identifying a communications component of the visited network to which the communications message is to be routed;
   defining an input vector for a classifier, the input vector encoding parameters of the communications component;
   executing the classifier to classify the communications component to determine a reliability state of the communications component; and
   forwarding the communications message to the communications component of the visited network for delivery to the subscriber device in dependence on the classified reliability state.

2. The method of claim 1, wherein the classifier is trained based on previous communications with the communications component as a training data set.

3. The method of claim 2, wherein, responsive to the message being forwarded to the communications component and an assessment of a reliability of the communications component based on a result of forwarding the communications message, the method further comprises adding the input vector and assessed reliability as a new training example in the training data set and triggering a retraining of the classifier.

4. The method of claim 1, wherein the communications message is a short message service (SMS) message, and the method is a method of a short message service center (SMSC) of the home telecommunications network.

5. The method of claim 1, wherein the communications component of the visited network is one of: a mobile switching center with visitor location register (MSC/VLR); or a mobile management entity (MME).

6. The method of claim 1, wherein the classified reliability state is one of an enumeration of a plurality of states of reliability.

7. The method of claim 1, wherein forwarding the communications message to the communications component in dependence on the classified reliability state includes:
   receiving one or more reliability criteria from an originator of the communications message; and
   forwarding the communications message to the communications component based on the reliability criteria evaluated using the classified reliability state.

8. The method of claim 1, wherein the communications component has associated an address and one or more of the parameters is defined in terms of address.

9. The method of claim 1, wherein parameters of the communication component include one or more of:

an indication of an association of the communications component with a telecommunications network;
an indication of a volume of communications messages successfully communicated via the communications component;
an indication of whether the subscriber device was steered to the communications component by a network roaming steering system of the home network;
an indication of whether a correctly encrypted response is received to an over-the-air (OTA) message dispatched to the subscriber device connected via the visited network;
an indication of whether a correctly encrypted response is received to an OTA message dispatched to a device of a second subscriber device connected via the visited network, the second subscriber device being a subscriber of the home network;
an indication of whether one or more previous communications messages have been successfully communicated to one or more devices communicating via the visited network, the devices being subscribers of the home network;
an indication of a change to a unique identifier of the subscriber device;
an indication of a change to a Subscriber Identity Module (SIM) of the subscriber device;
an indication of communications occurring with the communications component that are inconsistent with the nature of the communications component;
an indication of an identification of anomalous signaling traffic communicated via the communications component;
an indication of an output of a velocity check for the subscriber device;
an indication of a failure of the subscriber device to transition to a different telecommunications network when steered by a network roaming steering system of the home network;
an indication of a difference between a telecommunications network to which the communications component is associated, and a telecommunications network to which data traffic is sent or from which data traffic is received by the home network;
an indication of a proportion of a number requests for routing information for communications messages received at the home network to a number of occasions communications messages are forwarded to the visited network; and
an indication of asymmetric traffic flows to and from the communications component.

10. The method of claim 7, wherein communications messages which are not forwarded are retained for a re-evaluation of the reliability metric at a subsequent time.

11. The method of claim 4, wherein the home network is configured to use SMS Home Routing.

12. A computer system comprising:
   a processor and memory storing computer program code for selective transmission of a communications message from a home telecommunications network to a visited telecommunications network for delivery to a subscriber device roaming via the visited network by:
   receiving the communications message at the home network;
   identifying a communications component of the visited network to which the communications message is to be routed;

defining an input vector for a classifier, the input vector encoding parameters of the communications component;

executing the classifier to classify the communications component to determine a reliability state of the communications component; and forwarding the communications message to the communications component of the visited network for delivery to the subscriber device in dependence on the classified reliability state.

13. A non-transitory computer-readable storage medium storing a computer program element comprising computer program code to, when loaded into a computer system and executed thereon, cause the computer system to perform selective transmission of a communications message from a home telecommunications network to a visited telecommunications network for delivery to a subscriber device roaming via the visited network by:

receiving the communications message at the home network;

identifying a communications component of the visited network to which the communications message is to be routed;

defining an input vector for a classifier, the input vector encoding parameters of the communications component;

executing the classifier to classify the communications component to determine a reliability state of the communications component; and forwarding the communications message to the communications component of the visited network for delivery to the subscriber device in dependence on the classified reliability state.

* * * * *